Feb. 13, 1968    F. M. MINKS    3,369,151
CAPACITOR IGNITION SYSTEM HAVING A PULSE TRANSFORMER WITH
RESET MEANS AND AUXILIARY DISCHARGE MEANS
Filed March 1, 1965
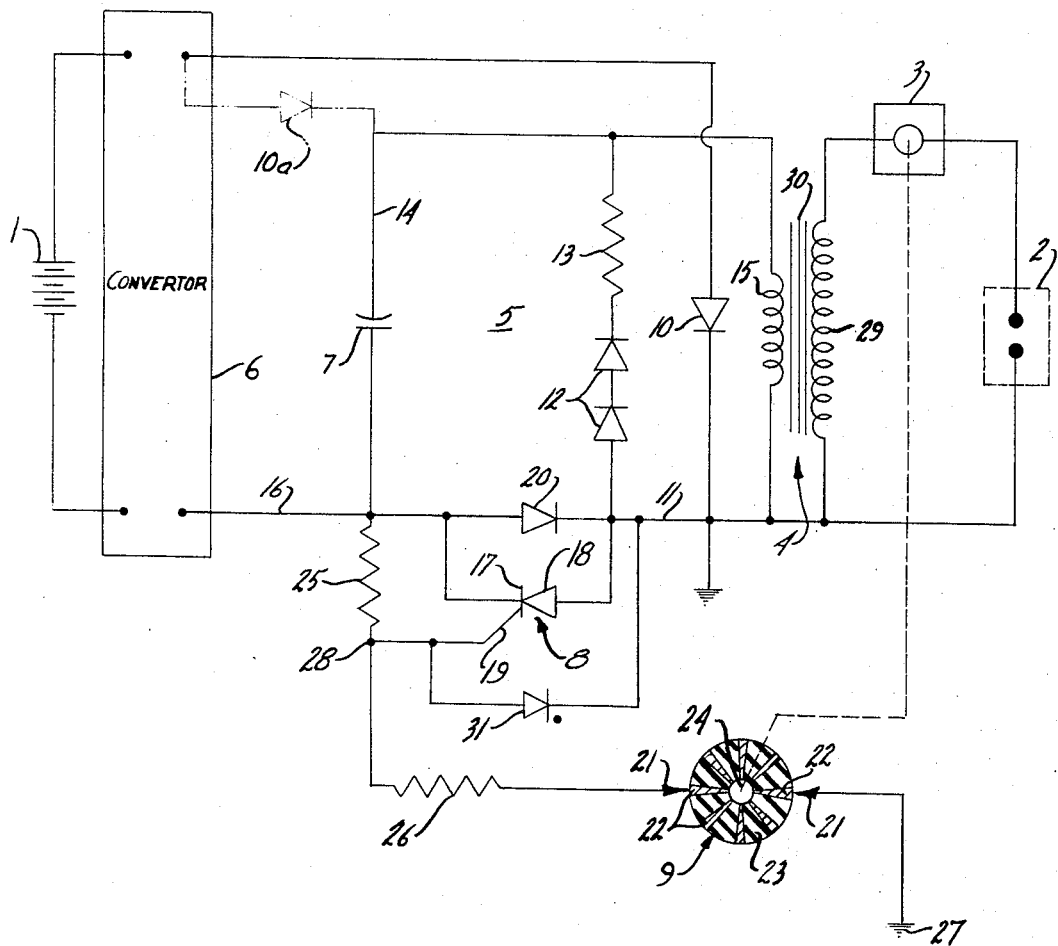
INVENTOR.
FLOYD M. MINKS
BY
Andrus & Starke
Attorneys

United States Patent Office 3,369,151
Patented Feb. 13, 1968

3,369,151
CAPACITOR IGNITION SYSTEM HAVING A PULSE TRANSFORMER WITH RESET MEANS AND AUXILIARY DISCHARGE MEANS
Floyd M. Minks, Port Washington, Wis., assignor to Kiekhaefer Corporation, Fond du Lac, Wis., a corporation of Delaware
Filed Mar. 1, 1965, Ser. No. 436,118
19 Claims. (Cl. 315—209)

ABSTRACT OF THE DISCLOSURE

The present disclosure is particularly directed to an improved capacitive storage circuit and means for switching of a silicon controlled rectifier or the like therefrom. In particular, a capacitor is charged by energy derived from a suitable source such as an alternator or a battery of the ignition system. It is connected in series circuit with a suitable electronic switching device such as a silicon controlled rectifier or similar device which is connected to igniting means.

---

This invention relates to a capacitor ignition system and particularly to an improved charging and discharging circuit for such a system.

Electronic ignition systems for internal-combustion engines have been suggested for a number of years. Recent developments have been directed to various circuits for charging a capacitor from the battery through circuits preferably employing solid state devices. The capacitor is periodically discharged through the induction coil of the usual ignition unit or a suitable pulse transformer by a properly timed switch means. The necessity for switching of the discharge circuit has generally been fairly complicated and expensive. Although thyratron gas tubes for example could satisfactorily be employed, their physical characteristics were not conducive to practical applications.

The development of silicon controlled rectifiers however generally is a functional solid state equivalent of a thyratron tube and has provided an improved and more satisfactory discharge switching means. However, the energy storage circuits employing capacitors with the output windings tend to oscillate and place substantial peak loads on the capacitor and the silicon controlled rectifier or the like. Further, the switching or firing circuits have generally employed breaker points in the input circuit with timing circuits for firing of the silicon controlled rectifier.

The present invention is particularly directed to an improved capacitive storage circuit and means for switching of a silicon controlled rectifier or the like therefrom. In particular, in accordance with the present invention, a capacitor is charged by energy derived from a suitable source such as an alternator or a battery of the ignition system. It is connected in series circuit with a suitable electronic switching device such as a silicon controlled rectifier or similar device which is connected to igniting means through the pulse transformer. In accordance with the present invention, a protective circuit is connected directly across the primary winding or other output member of the discharge circuit to the discharge side of the silicon controlled rectifier or other switch means. A highly satisfactory protective circuit can include one or more diodes with or without a series connected limiting resistor of relatively low resistance, such that the capacitor cannot discharge through the protective circuit. However, when the capacitor is essentially completely discharged and the primary winding tends to reverse the cycle as a result of the usual resonance phenomenon, energy of the coil is dissipated in the protective circuit and the capacitor and the silicon controlled rectifier are bypassed. This will substantially reduce the power requirements of both the capacitor and the switching device. Further, the charging power is preferably applied to the capacitor through the protective circuit in parallel with the primary of the pulse transformer. The relative impedance values of the two circuits are selected such that sufficient current is passed through the winding to reset the transformer core but insufficient to cause firing of the load.

Further, in employing a silicon controlled rectifier or the like in a discharge circuit, a low voltage or current signal applied to a firing terminal can be employed. As a result, applicant has found that the usual breaker point or special firing timing circuits can be eliminated and replaced with a simple commutator and series connected impedance connected for example between the silicon controlled rectifier gate and ground. When the commutator provides a complete circuit to ground, the main capacitor will tend to discharge through the circuit and provide a firing signal to the gate. Once the silicon controlled rectifier fires, the silicon controlled rectifier provides a very low impedance path and the capacitor discharges through the pulse transformer. The commutator provides a readily available and well known device for novel triggering of the control rectifier or the like. However, magnetic and optical trigger means can also be employed in view of the firing current involved.

As the firing currents are relatively small and of very short duration, generally of the order of 10 microseconds, the commutator or other similar trigger means provides an exceedingly long life and reliable operation in an ignition system in contrast to systems using breaker points.

The drawing furnished herewith illustrates a preferred method of carrying out the invention fully disclosing the above advantages and features as well as others which will be clear from the following description.

The drawing is a schematic circuit diagram of a preferred ignition system incorporating the subject matter of the present invention.

Referring to the drawing, an ignition system for an automobile, outboard motor or other similar device is schematically illustrated and includes a battery 1 providing a source of energy for firing of a spark gap 2. In the illustrated embodiment of the invention, a single spark gap is illustrated. In multicylinder engines, a plurality of gap means will be provided and interconnected for successive firing through a distributor 3. A single gap 2 is illustrated for simplicity and clarity of explanation.

The gap 2 is connected through a pulse transformer 4 to a capacitive energy storage circuit 5. A D.C. to A.C. or pulsed D.C. converter 6 connects the battery 1 to a capacitor 7 forming a part of the storage circuit 5. Converter 6 can be of any suitable construction and may be replaced by an alternator, not shown, such as presently employed in automobiles, outboard motors and the like. The blocking oscillator system disclosed in applicant's copending application entitled Power Converter filed on July 29, 1964 with Serial No. 385,904, now Patent No. 3,302,130, would provide an exceedingly satisfactory system if desired. Energy from the battery 1 is converted to rapidly charge the capacitor 7 to a selected value, for example, 100 volts which will provide a source of energy for firing of the gap 2 upon discharge of the capacitor.

Capacitor 7 is normally prevented from discharging through the transformer 4 by a switch means shown as a silicon controlled rectifier 8 which in accordance with known theory can be triggered or fired to conduct in one direction. In accordance with the present invention, a commutator 9 is interconnected between the silicon controlled rectifier gate and ground or other reference in such a way as to utilize a small part of the energy stored in the capacitor 7 to fire the silicon controlled rectifier 8 providing for periodic firing pulses through the silicon controlled rectifier 8 in properly timed relation with the engine for the optimum firing of gap 2. Between the discharges as determined by the commutator, the capacitor 7 is charged to its full value to maintain the energy source for each firing of the gap 2.

More particularly, in the illustrated embodiment of the invention, the circuit for charging of capacitor 7 includes a diode 10 connected to the output of the converter 6 and to a common ground line 11 which in turn is connected through a protective branch circuit shown including a pair of diodes 12 and a resistor 13 to the positive charging terminal or capacitor line 14. The primary winding 15 of the pulse transformer 4 is also connected between the common ground line 11 and the positive capacitor line 14 and thus in parallel with the protective branch circuit. The opposite end of the capacitor 7 is connected via a return line 16 to the opposite side of the converter 6. During charging of capacitor 7, current flows from diode 10 divided between the paralleled branches including primary 15 and diodes 12, respectively. The diodes 12 are selected with a forward voltage drop to force current through primary winding 15 for resetting of the transformer core 30, if necessary. Diodes 12 may be a plurality of separate units as shown or a unitary device such as a stabistor may be employed. Further, resistor 13 is generally very small and may be eliminated if the diodes are properly rated.

The silicon controlled rectifier 8 is connected between the converter return line 16 and the ground line 11. Thus, when the capacitor 7 is fully charged, it cannot discharge through the primary winding 15 as a result of the silicon controlled rectifier 8 nor can it discharge through the protective branch circuit which is connected to the transformer side of rectifier 8.

Generally, the silicon controlled rectifier 8 is schematically shown as it constitutes a well known element having a cathode 17 connected to the capacitor line 16 and an anode 18 connected to the common line 11 and thus to one side of primary winding 15. A firing gate 19 is connected to provide for timed conduction from the anode 18 to the cathode 17. A protective diode 20 is connected in parallel with the anode-cathode circuit and polarized in the reverse direction. The diode 20 primarily protects controlled rectifier 8 from high reverse voltages which may be reflected by the capacity associated with winding 29 if it is operated under conditions where a spark is not produced.

Firing of the silicon controlled rectifier 8 is controlled by application of firing pulses to the gate 19 as a result of operation of the commutator 9. The illustrated commutator includes a rotor 21 consisting of alternate conducting and insulating segments driven by the engine in common with the drive of the distributor to provide for timed operation and firing of the silicon controlled rectifier 8.

In the illustrated embodiment of the invention, brushes or contacts 21 slidably engage the opposite sides of the commutator rotor formed of alternate narrow conductor segments 22 and wide insulator segments 23 and complete a circuit therethrough when interconnected conducting segments 22 are properly aligned therewith in accordane with the usual commutating type action. The rotor includes a shaft 24 which may constitute one of the output brushes rather than the provision of separate brushes. The one brush 21 is connected in series with a pair of resistors 25 and 26 to the converter line 16 and the opposite brush 21 is connected as a ground 27. The resistor junction 28 is connected to the gate 19 and provides a current path through the gate to cathode junction to fire the silicon controlled rectifier 8 and thereby discharge the energy of the capacitor 7 through the primary winding 15 of transformer 4 when the commutator 9 completes the circuit.

The line 16 is negative with respect to the ground and when the commutator 9 completes the circuit to ground 27, current flows from ground through commutator 21, resistor 26 and the gate-cathode junction of rectifier 8, to line 16. The current through the gate 19 rises to the firing level of the silicon controlled rectifier 8 which conducts in the direction to begin to discharge capacitor 7. Thereafter, the removal of the gate signal will not control the subsequent firing so long as the anode 18 remains positive with respect to the cathode 17. Consequently, the commutator must conduct only a single pulse to provide for firing of the silicon controlled rectifier and discharge of the capacitor 7 through transformer 4.

Of substantial significance is the fact that the commutator 9 is only required to make a current path which is of a relatively high impedance and voltage. The problem of burning at the contacts is essentially eliminated.

The illustrated commutator 21 is shown including relatively narrow conducting segments 22 separated by wide insulating segments 23. The circuit need only be completed for the very short period needed to trigger the rectifier 8. In practice, the more conventional commutator with the relatively wide conducting segments and narrow insulating segments may be employed by properly connecting less than all of the conducting segments in the circuit.

Although the illustrated invention is highly reliable and practical, other systems may be employed; for example, light interruption or deflection systems with appropriate photoelectric means might also be employed.

In accordance with the illustrated construction, transformer 4 includes a separate secondary winding 29 which is electromagnetically coupled to the primary winding 15 by a core 30. Although any transformer arrangement such as an autotransformer system can be employed, applicant has disclosed a particularly satisfactory pulse transformer for ignition systems and the like in his copending application entitled Transformer filed on June 15, 1964 with Serial No. 374,925, now Patent No. 3,273,099. The pulse transformer specifically illustrated in that application includes an air gap which may be eliminated by employing the reset current previously described herein, if desired.

Briefly, the operation of the illustrated embodiment of the invention is summarized as follows. When the system is first started, the capacitor 7 will be discharged. Immediately upon completion of the circuit through any suitable means, the converter 6 charges the capacitor 7 to 100 volts, for example, from battery 1. The charging requires a period less than that of the spark frequency. Once charged to 100 volts, it will be maintained at that level until it is discharged through the primary winding 15 to fire gap 2.

The commutator 21 is driven in timed relation to the engine to periodically complete the current circuit through the gate 19, as previously described, to fire the rectifier 8. As a result, the capacitor 7 discharges and its energy is electromagnetically coupled through the core 30 to the secondary winding 29 and is of a sufficient level to cause spark-over and firing of the gap 2. The firing pulse is derived in timed relation to the engine. The firing energy is divided directly from the main capacitor 7.

When the capacitor 7 has discharged its energy, the inductance of the primary winding 15 will tend to cause oscillations with the energy moving in a direction to charge the capacitor 7 in an opposite direction. However, in the illustrated embodiment of the invention, the resistor 13 and particularly the diodes 12 provide a bypass which substantially eliminates any transfer of energy back to the capacitor 7 through the silicon controlled rectifier 8. Consequently, the current requirements of the capacitor 7 and the silicon controlled rectifier 8 are reduced up to fifty percent. This will allow substantial reductions in cost and increase the life of any given system.

Further, the firing of the silicon controlled rectifier 8 or the like requires only very low energy. The trigger circuit is being made and not broken to fire and at a relatively high voltage, a commutator 9 or other similar device will provide a very convenient and inexpensive trigger means having long life for providing timed firing of the silicon controlled rectifier and transfer of energy to gap 2 in accordance with the operation of the engine.

Additionally, in the illustrated embodiment of the invention, a protective Zener diode 31 or other similar device is connected between the gate 19 and the anode 18 of rectifier 8 to prevent damaging of the circuit components if the capacitor 7 is charged to an abnormal level for any reason. The Zener diode 31 is connected to be normally nonconductive and is selected with a breakdown voltage greater than the normal operating voltages but less than voltages which would damage the rectifier 8 or the other circuit components. If the voltage rises above the selected level of diode 31, it will conduct and cause the silicon controlled rectifier 8 to discharge the capacitor 7.

Alternatively, in place of diode 31, the diode 20 might be replaced with a Zener or avalanche diode of sufficient rating to carry the current that would create an abnormally high capacitor voltage. The Zener diode would thus conduct and maintain the capacitor 7 at the Zener voltage.

Further, in the illustrated embodiment of the invention, all of the diodes 10, 12, 20 and controlled rectifier 8 are connected to the common line 11 and consequently can be mounted on a common heat sink. In the event such a heat sink is not necessary, and the forced current reset provided by the illustrated connection is not used, the charging power connection can be made directly to the top side of the capacitor, i.e., to the converter line 14 as shown in phantom in the drawing with the diode identified as diode 10A for purposes of clarity and simplicity of explanation.

The present invention provides an improved discharge circuit for an ignition system for internal-combustion engines and the like which increases the reliability and reduces the required capability of the components. The present invention therefore provides a highly improved control for semiconductor ignition systems and the like.

Various modes of carrying out the invention are contemplated as being within the scope of the following claims particularly pointing out and distinctly claiming the subject matter which is regarded as the invention.

I claim:

1. An ignition circuit for internal-combustion engines and the like, comprising
   a capacitor for storing energy,
   a pulse transformer having an input winding and an output winding coupled by a magnetically resettable core and connected to fire the engine,
   an electronic switch means connected in series with the capacitor and the input winding and having input means to control conduction therethrough,
   control means connected in circuit with the input means and adapted to be connected to a power source to periodically discharge said capacitor into said transformer, and
   a charging means connected to the capacitor with at least a portion of the charging current to the capacitor resetting the core of the pulse transformer.

2. An ignition circuit for internal-combustion engines and the like, comprising
   a capacitor for storing energy,
   a pulse transformer having an input winding and an output winding coupled by a magnetically resettable core and connected to fire the engine,
   an electronic switch means connected in series with the capacitor and the input winding and having input means to control conduction therethrough,
   control means connected in circuit with the input means and adapted to be connected to a power source to periodically discharge said capacitor into said transformer,
   an auxiliary discharge circuit connected directly across the input winding and polarized to conduct and prevent reverse polarity charging of the capacitor and to reduce the reverse voltage impressed on the switch, and
   a charging means connected to the capacitor and including means in parallel with the pulse transformer and selected of an impedance to conduct the principal portion of the charging current to the capacitor and to divert a portion of the charging current to the input winding of the transformer for resetting the core of the pulse transformer.

3. An ignition circuit for internal-combustion engines and the like, comprising
   a capacitor for storing energy with a selected positive polarity side,
   a pulse transformer having an input winding and an output winding connected to fire the engine,
   an electronic switch means connected in series with the capacitor and the input winding and having input means to control conduction therethrough,
   control means connected in circuit with the input means and adapted to be connected to a power source to periodically discharge said capacitor into said transformer,
   a protective diode means connected across the input winding and polarized to conduct in the direction of the positive side of the capacitor, said diode serving to conduct energy stored in the leakage inductance of the input winding and to prevent reverse polarity charging of the capacitor, and
   a second diode means connected to the common side of the input winding and the protective diode means, said second diode means being polarized to conduct in the same direction as said protective diode means and adapted to be connected to a power source for providing charging current to the capacitor, said protective diode means having a forward voltage drop causing a selected portion of the charging current to flow through the input winding to reset the pulse transformer.

4. The circuit of claim 3 wherein said control means is connected to the capacitor and derives its power therefrom.

5. The circuit of claim 3 wherein said control means includes a commutating means driven in timed relation to the engine and selectively completes a power circuit through said input means.

6. The circuit of claim 5 wherein the switch means is a silicon controlled rectifier having a gate circuit forming the input means and being connected in series with the commutating means to the capacitor to selectively create a firing current flow through said gate circuit.

7. An ignition circuit for internal-combustion engines and the like having a voltage source and an igniting means, comprising
   a capacitor adapted to be connected to said voltage source for storing energy,
   a transformer for interconnection between the capacitor and the igniting means,
   an electronic switch connected in series with the capacitor and the transformer and having a firing gate to control conduction therethrough,
   a commutator connected in circuit with the firing gate and a power source to periodically discharge said capacitor, and
   an auxiliary discharge circuit connected directly across the transformer and polarized to conduct and prevent reverse polarity charging of the capacitor.

8. An ignition system for internal-combustion engines and the like having a voltage source and pulse responsive firing means, comprising
   energy storage means adapted to be connected to said voltage source and adapted to be periodically charged and discharged,
   electronic switch means connected to the storage means and connected in a firing circuit with said firing means adapted to transfer power to the firing means, said switch means being a triggered device having an input gate and
a commutator connected in a trigger circuit to said input gate of said electronic switch means and periodically actuating said switch means, the current and voltage associated with the commutator at the time of opening the trigger circuit being substantially zero.

9. In an ignition system for internal-combustion engines and the like having an ignition spark gap means,
a pulse transformer having an input winding and an output winding adapted to be connected to the spark gap means,
a storage capacitor for firing of the spark gap means,
a gate controlled switch means connected in series with the input winding and the storage capacitor,
a source of charging current,
a diode means connecting one side of the source to the capacitor,
a second diode means,
an impedance in a series circuit with the second diode means across the input winding, and
means connected to the switch means to operatively close the switch means in timed relation to a selected firing frequency.

10. The ignition system of claim 9 wherein said last named means includes,
a firing circuit connected to the gate terminal and including a commutator connecting said capacitor to a reference potential through a high impedance circuit.

11. An ignition circuit for internal-combustion engines and the like having a voltage source and an igniting means, comprising
a capacitor adapted to be connected to said voltage source for storing energy,
a transformer for connection to the capacitor,
an electronic switch connected in series with the capacitor and the transformer to be connected to the igniting means and having a means to control conduction therethrough and discharge said capacitor into said load, and
voltage sensitive means connected across the electronic switch and responsive to a selected abnormally high voltage of the capacitor to turn on the switch discharging the capacitor to thereby hold said capacitor at a maximum voltage level.

12. The ignition circuit of claim 11 wherein the switch is a silicon controlled rectifier having a gate connected to the means to discharge the capacitor and the voltage sensitive means is an avalanche type diode connected from anode to gate of the rectifier to trigger the rectifier and discharge the capacitor before the capacitor voltage reaches a destructive level.

13. In an ignition system for internal-combustion engines and the like having an ignition spark gap means,
a pulse transformer having an input winding and an output winding adapted to be connected to the spark gap means,
a storage capacitor for storing energy for firing of the spark gap means,
a gate controlled switch means connected in series with the input winding and the storage capacitor,
means connected to said switch means to periodically trigger the switch means to conduct,
a ground line connected to the connection of the switch means and the input winding,
a source of charging current,
a diode connecting one side of the source to the ground line,
a return line connecting the opposite side of the source to the connection of the switch means to the capacitor, and
a second diode having an anode connected to the ground line and a cathode connected to the connection of the capacitor to the input winding.

14. The ignition system of claim 13 having a resistor connected between the second diode and the connection of the capacitor to the input winding.

15. The ignition system of claim 13 having a diode connected in parallel with the switch means to prevent reverse voltage transients across the switch means.

16. The ignition system of claim 15 wherein the diode is an avalanche type diode and responsive to a selected maximum capacitor voltage to conduct and hold the capacitor at the selected maximum capacitor voltage.

17. An ignition circuit for internal-combustion engines and the like having a voltage source and an igniting means, comprising
a capacitor adapted to be connected to said voltage source for storing energy,
a transformer for connection to the capacitor,
an electronic switch connected in series with the capacitor and the transformer to be connected to the igniting means and having a means to control conduction therethrough, and
circuit means connected to derive power from said capacitor and to periodically actuate the switch means and discharge the capacitor through said transformer.

18. The ignition circuit of claim 17 wherein the switch comprises a controlled rectifier having a gate circuit connected to the one side of the capacitor and the circuit means includes an impedance in series with a timing switch means connected between the opposite side of the gate circuit and a reference potential whereby closing of the timing switch means completes a circuit through the gate.

19. An ignition circuit for internal-combustion engines and the like having a voltage source and an igniting means, comprising,
a capacitor adapted to be connected to said voltage source for storing energy,
switch means connected in a series circuit with the capacitor and said igniting means and having a control means to control conduction therethrough, and
a high impedance firing circuit including an impedance element connected in series with an engine-driven commutator to said capacitor to provide a power source and connected to fire said switch means whereby said igniting means is then energized from said stored energy.

References Cited

UNITED STATES PATENTS

| | | | |
|---|---|---|---|
| 3,007,082 | 10/1961 | Kappelle | 315—209 |
| 3,056,066 | 9/1962 | Dozier | 315—223 |
| 3,078,391 | 2/1963 | Bunodiere et al. | 315—205 |
| 3,087,000 | 4/1963 | Krone | 123—146.5 |
| 3,169,212 | 2/1965 | Walters | 315—223 |
| 3,242,420 | 3/1966 | Ulrey | 323—58 |
| 3,248,604 | 4/1966 | Richards | 315—209 |
| 3,259,798 | 7/1966 | Yonge | 315—219 X |
| 3,263,124 | 7/1966 | Stuermer | 315—212 |
| 3,275,884 | 9/1966 | Segall et al. | 315—209 X |

JOHN W. HUCKERT, *Primary Examiner.*

JAMES D. KALLAM, *Examiner.*

D. O. KRAFT, R. F. POLISSACK, *Assistant Examiners.*